United States Patent [19]

Lienhard et al.

[11] Patent Number: 4,866,112
[45] Date of Patent: Sep. 12, 1989

[54] THERMOPLASTICS CONTAINING A NICKEL COMPLEX PIGMENT

[75] Inventors: Paul Lienhard, Frenkendorf, Switzerland; Edward E. Jaffe, Wilmington, Del.

[73] Assignee: Ciba-Geigy Corporation, Ardsley, N.Y.

[21] Appl. No.: 226,358

[22] Filed: Jul. 29, 1988

[51] Int. Cl.[4] .............................................. C08K 5/34
[52] U.S. Cl. ........................................ 524/87; 524/94
[58] Field of Search .................................... 524/87, 94

[56] References Cited

U.S. PATENT DOCUMENTS

| | | | |
|---|---|---|---|
| 3,132,140 | 5/1964 | Jaffe | 260/240 |
| 3,677,782 | 7/1972 | MacPherson | 106/288 Q |
| 3,700,709 | 10/1972 | Inman et al. | 260/438.1 |
| 3,864,371 | 2/1975 | Inman et al. | 260/439 R |
| 3,875,200 | 4/1975 | L'Eplattenier et al. | 260/439 R |
| 3,963,708 | 6/1976 | L'Eplattenier et al. | 260/240 G |
| 4,008,225 | 2/1977 | L'Eplattenier et al. | 544/226 |

FOREIGN PATENT DOCUMENTS 2008938 9/1971 Fed. Rep. of Germany .
2728864 1/1978 Fed. Rep. of Germany .
1534787 12/1978 United Kingdom .

OTHER PUBLICATIONS

Herbst et al., Industrielle Organische Pigmente: Herstellung, Eigenschaften, Anwendung, p. 104 (1987).

Primary Examiner—Lewis T. Jacobs
Attorney, Agent, or Firm—Harry Falber

[57] ABSTRACT

Thermoplastic, high-molecular-weight material which can be processed in the melt and which contains at least one nickel complex derived from a ligand of the formula I

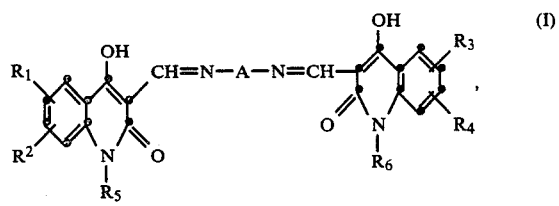

in which $R_1$, $R_2$, $R_3$ and $R_4$, independently of one another, are —H, halogen or —CH$_3$, $R_5$ and $R_6$, independently of one another, are —H or $C_1$–$C_4$alkyl, A is a para-phenylene radical of the formula II or a mixture of a para-phenylene radical of the formula II with an orthophenylene radical of the formula III

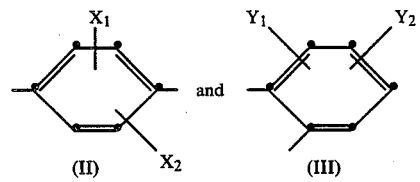

the proportion of ortho-phenylene radical in the mixture being not more than 60% by weight, and $X_1$ and $X_2$, independently of one another, are —H, halogen, —CH$_3$, —OCH$_3$ or —OC$_2$H$_5$, and $Y_1$ and $Y_2$, independently of one another, are —H, halogen, —CH$_3$ or —OCH$_3$, or $Y_1$ is a radical of the formula

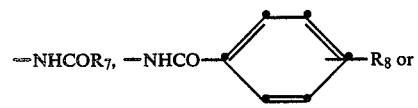

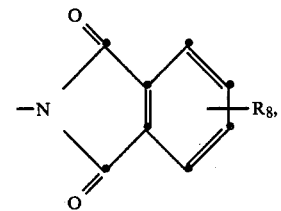

and $Y_2$ is —H, or $Y_1$ and $Y_2$ together are —NHCONH— or —CONHCO—, where $R_7$ is —H or $C_1$–$C_4$alkyl and $R_8$ is —H, halogen, —CH$_3$ or —OCH$_3$.

8 Claims, No Drawings

THERMOPLASTICS CONTAINING A NICKEL COMPLEX PIGMENT

This invention relates to thermoplastics containing at least one bisazomethine-nickel complex pigment, and also to novel nickel complexes.

Metal complexes and their use as colorants for colouring high-molecular-weight organic materials have been known to those skilled in the art for a long time. A large number of various types of structure have already been proposed, of which the azomethine-metal complexes are amongst the best known types of structure, in particular due to their good general pigment properties. Examples of these are described, for example, in U.S. Pat. Nos. 3,677,782 and 3,700,709 (monoazomethine-copper complexes), 3,864,371 (bisazomethine-nickel complex) and 3,875,200 (bisazomethine-metal complexes containing a 2,3-oxynaphthoic acid radical), in U.S. Pat. No. 3,963,708 and in GB Pat. No. 1,534,787 (bisazomethine-metal complexes containing oxycoumarin radicals or nitrogen-substituted quinoline radicals), in U.S. Pat. No. 4,008,225 (bisazomethine-metal complexes containing aldehyde components of various types or in German Offenlegungsschrift No. 2,008,938 (bisazomethine-metal complexes containing a dioxypyridine radical).

A particular feature of the metal complexes specified as preferred therein is that the ligand forms chelate rings with the metal atom, the central ring, containing the nitrogen atom, containing a fused aromatic o-phenylene ring system. Bisazomethine-nickel complexes are also disclosed by U.S. Pat. No. 3,132,140, the compounds described therein being derived from two oxyaldehyde radicals and one o- or p-phenylenediamine and being proposed as pigments for colouring paints.

In addition, it is known that the processing of many plastics, in particular engineering plastics, requires high temperatures, and high demands are therefore made on the thermal resistance of the pigments employed therein. Such demands are fulfilled only by a few organic pigments [see, for example, "Industrielle organische Pigmente: Herstellung, Eigenschaft, Anwendung" (Industrial organic pigments: Preparation, properties and use"), page 104, Willy Herbst and Klaus Hunger, 1987, VCH Verlagsgesellschaft mbH, D-6940 Weinheim]. Even the azomethine-metal complexes do not behave ideally in such applications and often exhibit poor or borderline thermal stability.

It has now been found that certain types of structure of bisazomethine-nickel complexes containing a ligand comprising specific dioxyquinolinaldehyde radicals and certain phenylenediamines or mixtures thereof are distinguished by excellent pigment properties in thermoplastics, in particular by ideal thermal stability.

The invention accordingly relates to thermoplastic, high-molecular-weight material which can be processed in the melt and which contains at least one nickel complex derived from a ligand of the formula I

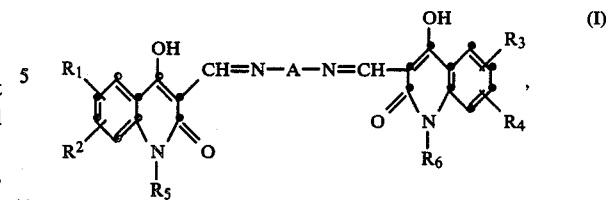

in which $R_1$, $R_2$, $R_3$ and $R_4$, independently of one another, are —H, halogen or —$CH_3$, $R_5$ and $R_6$, independently of one another, are —H or $C_1$-$C_4$alkyl, A is a para-phenylene radical of the formula II or a mixture of a para-phenylene radical of the formula II with an ortho-phenylene radical of the formula III

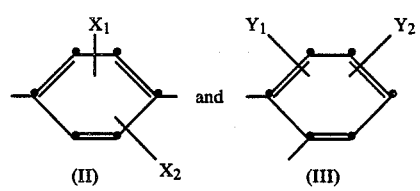

the proportion of ortho-phenylene radical in the mixture being not more than 60% by weight, and $X_1$ and $X_2$, independently of one another, are —H, halogen, —$CH_3$, —$OCH_3$ or —$OC_2H_5$, and $Y_1$ and $Y_2$, independently of one another, are —H, halogen, —$CH_3$ or —$OCH_3$, or $Y_1$ is a radical of the formula

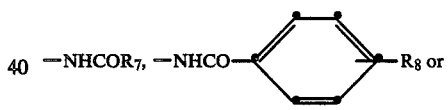

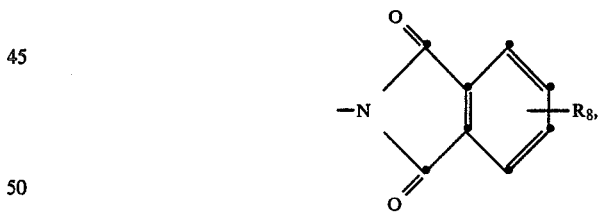

and $Y_2$ is —H, or $Y_1$ and $Y_2$ together are —NHCONH— or —CONHCO—, where $R_7$ is —H or $C_1$-$C_4$alkyl and $R_8$ is —H, halogen, —$CH_3$ or —$OCH_3$.

Halogen $R_1$, $R_2$, $R_3$, $R_4$, $R_8$, $X_1$, $X_2$, $Y_1$ and $Y_2$ are chlorine, bromine, iodine or fluorine, but in particular chlorine.

$C_1$-$C_4$alkyl $R_5$, $R_6$ and $R_7$ can be, for example, —$CH_3$, —$C_2H_5$, —n—$C_3H_7$, —iso—$C_3H_7$ or —n—$C_4H_9$.

$R_5$ and $R_6$ are preferably —H.

If $Y_1$ and $Y_2$ together are —NHCONH—, they can be, for example, the following radicals (of the formula III)

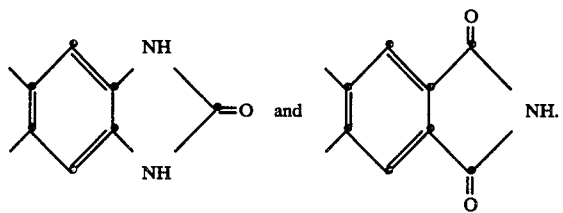

Thermoplastic material containing a nickel complex derived from a ligand of the formula I in which A is a para-phenylene radical of the formula IV

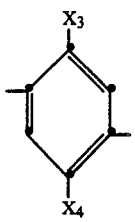

(IV)

where $X_3$ and $X_4$, independently of one another, are —H, —Cl, —CH$_3$ or —OCH$_3$, is of particular interest.

Likewise of particular interest is a thermoplastic material containing a nickel complex derived from a ligand of the formula I in which A is a para-phenylene radical of the formula IV or a mixture of a para-phenylene radical of the above formula IV and an ortho-phenylene radical of the formula III where $X_3$, $X_4$, $Y_1$ and $Y_2$, independently of one another, are —H or —Cl.

Of very particular interest is a thermoplastic material containing a nickel complex derived from a ligand of the formula I in which A is para-phenylene or a mixture of para-phenylene and ortho-phenylene where the ortho-phenylene proportion in the mixture is between 1 and 50% by weight, and $R_1$, $R_2$, $R_3$, $R_4$, $R_5$ and $R_6$ are —H.

Likewise of very particular interest is the nickel complex derived from a ligand of the formula I in which $R_1$, $R_2$, $R_3$, $R_4$, $R_5$ and $R_6$ are —H and A is para-phenylene.

The nickel complexes which are derived from a ligand of the formula I and which are suitable according to the invention are obtained when, for example:

(a) one mole each of a 3-formyl-4-hydroxy-2-oxoquinoline of the formula V and VI (or the 3-arylaldimine derivatives thereof)

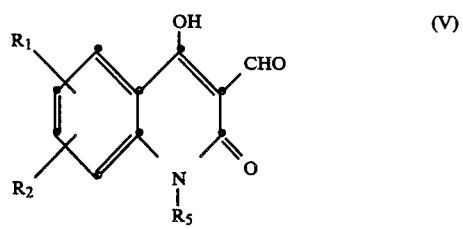

(V)

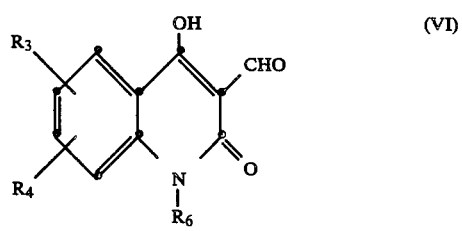

(VI)

are condensed with one mole of a para-phenylenediamine of the formula VII or with one mole of a mixture of a para-phenylenediamine of the formula VII and an ortho-phenylenediamine of the formula VIII

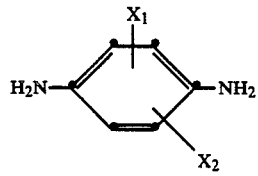

(VII)

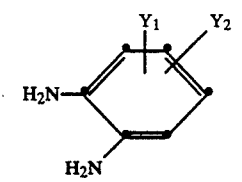

(VIII)

in any desired sequence by processes known per se (such as described, for example, in U.S. Pat. Nos. 3,132,140 and 4,008,225) and reacted with a nickel salt during or after the condensation, or (b) 2 moles of a suitable 4-hydroxy-2-oxoquinoline are condensed with one mole of an above-defined phenylenediamine which is suitable according to the invention (or a mixture thereof) in the presence of a formamidine or a trialkyl orthoformate of the formula HC(OR)$_3$, and the ligand thus formed is reacted with a nickel salt or a nickel complex compound, the radicals $X_1$, $X_2$, $Y_1$, $Y_2$, $R_1$, $R_2$, $R_3$, $R_4$, $R_5$ and $R_6$ in the formulae V, VI, VII and VIII having the abovementioned meaning. Examples of trialkyl orthoformates are alkyl esters having 1 to 5 C atoms, but in particular triethyl orthoformate.

The starting materials used in the above processes (a) and (b) are known compounds. The 3-arylaldimine derivatives can be prepared, for example, by the process given in U.S. Pat. No. 4,008,225.

The condensations carried out in processes (a) and (b) are expediently performed in an inert organic solvent, for example in an aliphatic alcohol having 1 to 4 C atoms, such as methanol, ethanol, isopropanol and butanol, furthermore in glycols or glycol ethers, open-chain or cyclic amines, such as dimethylformamide, dimethylacetamide or N-methylpyrrolidone, or in mixtures of the abovementioned solvents or in mixtures of the solvents mentioned with water. A slight excess of aldehyde, aldimine or trialkyl orthoformate may be advantageous. The amount of solvent is not critical per se and is determined by the stirrability or miscibility of the reaction batch. The reaction is generally carried out at temperatures above 60° C.

Examples of starting materials of the formulae V to VI, and the arylaldimine derivatives thereof, which may be mentioned are: 2,4-dihydroxy-3-formylquinoline, 2,4-dihydroxy-6-chloro-3-formylquinoline, 2,4-dihydroxy-6-methyl-3-formylquinoline, 2,4-dihydroxy-7,8-dichloro-3-formylquinoline, N-phenyl-2,4-dihydroxyquinoline-3-aldimine, N-phenyl-2,4-dihydroxy-6-methylquinoline-3-aldimine, N-phenyl-2,4-dihydroxy-6-chloroquinoline-3-aldimine and 4-hydroxy-3-formyl-2-oxo-1-methylquinoline.

Examples of diamines of the formulae VII and VIII which may be mentioned are: 1,2-phenylenediamine, 4-chloro-1,2-phenylenediamine, 4,5-dichloro-1,2-phenylenediamine, 4-methyl-1,2-phenylenediamine, 4,5-dimethyl-1,2-phenylenediamine, 3,5-dimethyl-1,2-phenylenediamine, 4-methoxy-1,2-phenylenediamine, 4,5-dimethoxy-1,2-phenylenediamine, 1,4-diaminobenzene, 1,4-diamino-2-chlorobenzene, 1,4-diamino-2-bromobenzene, 1,4-diamino-2,5-dichlorobenzene, 1,4-diamino-2-methylbenzene, 1,4-diamino-2,5-dimethylbenzene, 1,4-diamino-2-methoxybenzene, 1,4-diamino-2,5-dimethoxybenzene, 1,4-diamino-2,5-diethoxybenzene, 2-chloro-5-methyl-1,4-phenylenediamine, 2-chloro-5-methoxy-1,4-phenylenediamine and 2-methyl-5-methoxy-1,4-phenylenediamine.

A further subject-matter of the invention relates to novel nickel complexes derived from a ligand of the above formula I in which $R_1$, $R_2$, $R_3$ and $R_4$, independently of one another, are —H, halogen or —$CH_3$, $R_5$ and $R_6$, independently of one another, are —H or $C_1$-$C_4$alkyl, and A is a para-phenylene radical of the above formula II or a mixture of a para-phenylene radical of the above formula II and an ortho-phenylene radical of the above formula III, the proportion of ortho-phenylene radical in the mixture being not more than 60% by weight, and $X_1$ and $X_2$, independently of one another, are —H, halogen, —$CH_3$, —$OCH_3$ or —$OC_2H_5$, and $Y_1$ and $Y_2$ independently of one another, are —H, halogen, —$CH_3$ or —$OCH_3$, or $Y_1$ is a radical of the formula —$NHCOR_7$,

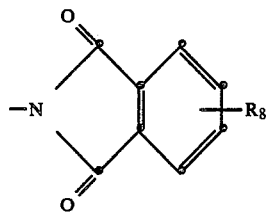

and $Y_2$ is —H, or $Y_1$ and $Y_2$ together are —NHCONH— or —CONHCO—, where $R_7$ is —H or $C_1$-$C_4$alkyl and $R_8$ is —H, halogen, —$CH_3$ or —$OCH_3$, and where A cannot be para-phenylene when $R_1$, $R_2$, $R_3$, $R_4$, $R_5$ and $R_6$ are —H.

In formula I, $R_5$ and $R_6$ are preferably —H.

Likewise preferred are nickel complexes derived from a ligand of the formula I in which $R_1$, $R_2$, $R_3$ and $R_4$, independently of one another, are —H, —Cl or —$CH_3$, and A is a para-phenylene radical of the above formula IV or a mixture of a para-phenylene radical of the formula IV and an ortho-phenylene radical of the above formula III in which $X_3$, $X_4$, $Y_1$ and $Y_2$ are —H or —Cl and the ortho-phenylene proportion in the mixture is between 1 and 50% by weight.

The nickel complexes of the formula I prepared by the above-described methods usually precipitate even from the hot solution and can be isolated in pure form by filtering off and, if necessary, by washing with organic solvents.

They are valuable pigments which generally have good texture and can usually be used as the crude product. If necessary or desired, the crude products can be converted into a finely disperse form by grinding or kneading. Grinding auxiliaries, such as grinding elements made from glass, plastic, steel or metal, inorganic and/or organic salts, in the presence or absence of organic solvents, are advantageously used. After grinding, the auxiliaries are removed as usual, for example soluble inorganic salts using water and water-insoluble auxiliaries by steam distillation. Treatment of the crude pigments with organic solvents can also often improve the pigment properties.

Thermoplastic, high-molecular-weight, organic materials which can be processed in the melt and which can be dyed or pigmented using the nickel complexes derived from a ligand of the formula I are, for example, polyolefins, such as polyethylene, polypropylene, polybutylene and polyisobutylene, furthermore, styrene polymers, such as polystyrene or copolymers and terpolymers of styrene with acrylonitrile (=SAN) or with acrylonitrile and polybutadiene (=ABS), polycarbonates, polyvinyl chloride, polyesters, such as polyethylene glycol terephthalate, polyamides, fluorinated polymers, such as polytetrafluoroethylene, polymethyl methacrylate, polyurethanes, polyacetals, polyethers, polyphenylene oxides, polyphenylene sulfides, polysulfones, polyimides, polyesterimides and copolymers of such substances, for example polybutylene terephthalate and polycarbonate.

Preferred polymers are polyethyene, polypropylene, polystyrene, polyesters, polyamides, polycarbonates and ABS.

Depending on the purpose of use, it has proven advantageous to employ the nickel complexes which are suitable according to the invention as toners or in the form of formulations. They can be employed, for example, in an amount from 0.01 to 15% by weight, preferably 0.1 to 5% by weight, relative to the high-molecular-weight organic material to be pigmented.

The abovementioned high-molecular-weight organic substances can be pigmented with the nickel complexes derived from a ligand of the formula I by, for example, admixing a nickel complex of this type, if appropriate in the form of a masterbatch, with these substrates using roll mills, mixers or grinders. The pigmented material is then converted into the final form desired by processes which are known per se, such as calendering, compression moulding, extrusion, casting or injection moulding. It is often desired to incorporate so-called plasticizers into the high-molecular-weight compounds before moulding in order to reduce their brittleness. Suitable plasticizers are, for example, esters of phosphoric acid, phthalic acid or sebacic acid. The plasticizers can be incorporated into the polymers before or after incorporation of the nickel complexes according to the application. Besides the nickel complexes according to the application, it is furthermore possible to add fillers or other colouring components, such as white, coloured or black pigments, in any amounts to the high-molecular-weight, organic substances in order to achieve various shades.

As a consequence of their excellent thermal resistance and good dispersibility, the nickel complexes according to the application are suitable, in particular, for colouring modern engineering plastics. In addition, colourings obtained are distinguished by good general properties, for example high tinctorial strength, transparency and purity of shade (depending on the substrate and the pigment particle size), and good resistance to migration, light and weather. If the particle size is optimum, the nickel complexes according to the application can also have high covering power.

The examples below serve to illustrate the invention.

EXAMPLE 1

0.6 g of the 1:1 nickel complex of the ligand of the formula

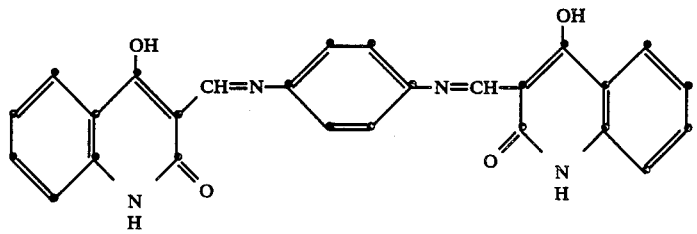

in ground form are mixed with 67 g of polyvinyl chloride, 33 g of dioctyl phthalate, 2 g of dibutyltin dilaurate and 2 g of titanium dioxide, and processed in the roll mill for 15 minutes at 160° C. to form a thin film. The greenish yellow PVC film thus produced is homogeneously and intensely coloured, and resistant to migration and light.

EXAMPLE 2

0.6 g of the pigment prepared from 0.1 mol of the ligand of the formula

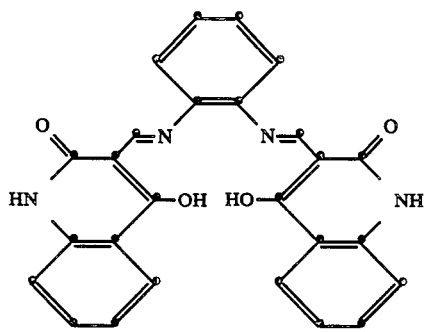

and 0.1 mol of the ligand of the formula

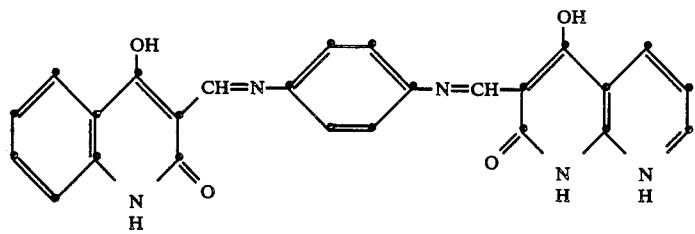

and 0.22 mol of nickel acetate tetrahydrate in dimethylformamide are incorporated into PVC as described in Example 1. The yellow film obtained is resistant to migration and light.

The pigment mixture obtained has the following elemental analysis (for $C_{26}H_{16}N_4O_4Ni$ containing 1.25% of water, calculated in %):

|  | C | H | N | Ni |
| --- | --- | --- | --- | --- |
| calculated: | 60.81 | 3.28 | 10.91 | 11.44 |
| found: | 60.81 | 3.53 | 11.02 | 10.9 |

Likewise fast yellow colourings are obtained using an analogous procedure when 0.6 g of the nickel complex prepared from 0.08 mol of the first ligand and 0.12 mol of the second ligand or 0.12 mol of the first ligand and 0.08 mol of the second ligand is employed.

EXAMPLE 3

A mixture [comprising 1 g of the nickel complex of Example 1, 1 g of antioxidant (®IRGANOX 1010, CIBA-GEIGY AG) and 1,000 g of HD polyethylene granules (®VESTOLEN 60-16, HUELS)] is premixed for 15 minutes in a glass bottle on a roll bench. The mixture obtained is then extruded in two passages through a single-screw extruder. The granules thus obtained are moulded to form small plates on an injection moulding machine (Allround Aarburg 200) at 220° C., and compressed for a further 5 minutes at 180° C. The plates have intensely coloured, greenish yellow shades with excellent resistance properties.

EXAMPLE 4

1 g of the nickel complex pigment mentioned in Example 1, 10 g of titanium dioxide (CL 200 quality from KRONOS, Leverkusen, FRG) and 1,000 g of the plastic ABS (®TERLURAN 877M from BASF) are mixed for 15 minutes in a 3 l glass flask. The mixture is forced twice through a small extruder (type 133 from COLLIN, Ebersberg, FRG) at 190° C., and granulated after each extrusion. The material is then dried for 4 hours at 90° C. Small plates measuring about 3.5×4.5×0.2 cm are moulded from the coloured granules in an injection-moulding machine (model 200 from AARBURG, Lossburg, FRG) at 200° C. The melting zone is then heated to 260° C. or 280° C. and further plates of the stated dimensions are moulded after a residence time of 5 minutes in each case. The plates produced at 200° C., 260° C. or 280° C. have a similar greenish yellow shade and are distinguished by good light resistance.

EXAMPLE 5

Using the same procedure as in Example 4, greenish yellow plates having good light resistance are obtained using 2.5 g of a 40% formulation of the nickel complex pigment mentioned in Example 1 (base resin: polyethylene wax AC-617 from Allied Chem.).

EXAMPLE 6

Using the same procedure as in Example 4, orange plates are obtained from 2.5 g of a 40% formulation (base resin as in Example 5) of the nickel complex pigment of Example 1 and 1 g of the perinone dye Solvent Red C.I. No. 135.

EXAMPLE 7

2 g of a 50% formulation of the nickel complex pigment described in Example 2 (base resin: colophonium ester, brand Dertopoline G from DRT, F-40103 Dax) are incorporated into ABS plates as described in Example 4. The plates are yellow and have good light resistance.

EXAMPLE 8

1 g of the pigment described in Example 2, 10 g of titanium dioxide and 1,000 g of polycarbonate (®Macrolon 2800 from BASF) are mixed thoroughly and pre-dried at 120° C. The mixture is extruded twice at 260° C. and granulated and subsequently re-dried at 120° C. Plates are injection-moulded from the coloured granules at 280° C., 300° C., 320° C. and 340° C. Intensely yellow, light-resistant colourings are obtained at all temperatures.

EXAMPLE 9 1 g of the nickel complex pigment described in Example 1, 10 g of titanium dioxide and 1,000 g of the copolymer ®Kenoy CL 100 (mixture of polybutylene terephthalate and polycarbonate, powder quality from GENERAL ELECTRIC, Bergen, NL) are mixed thoroughly. The mixture is extruded twice at 250° C. and granulated, and dried at 120° C. The coloured granules are injection-moulded to form small plates at 260° C., 280° C. and 290° C., in each case after a residence time of 5 minutes for the material at these temperatures. Greenish yellow, light-resistant colourings are obtained.

EXAMPLES 10-15

Likewise high-quality yellow plastic films or mouldings are obtained using an analogous procedure when a nickel complex pigment derived from a ligand of the formula I in which A, $R_5$ and $R_6$ are —H and $R_1$, $R_2$, $R_3$ and $R_4$ are as defined in the table below is employed. The combustion analysis of these examples confirms the 1:1 nickel complex composition; this means that one N atom is present per mole of ligand.

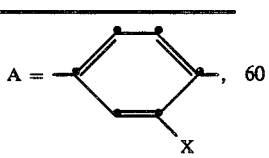

| Example No. | $R_1$ | $R_3$ | $R_2$ | $R_4$ | where X = |
|---|---|---|---|---|---|
| 10 | 6-CH$_3$ | 6-CH$_3$ | H | H | H |
| 11 | 6-Cl | 6-Cl | H | H | H |
| 12 | 5-Cl | 5-Cl | 8-Cl | 8-Cl | H |
| 13 | 6-Cl | 6-Cl | 8-Cl | 8-Cl | H |
| 14 | 7-Cl | 7-Cl | 8-Cl | 8-Cl | H |

-continued

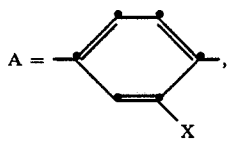

| Example No. | $R_1$ | $R_3$ | $R_2$ | $R_4$ | where X = |
|---|---|---|---|---|---|
| 15 | H | H | H | H | Cl |

What is claimed is:

1. A thermoplastic, high-molecular-weight material which can be processed in the melt and which contains at least one nickel complex derived from a ligand of the formula I

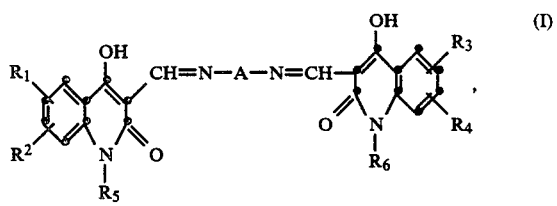

in which $R_1$, $R_2$, $R_3$ and $R_4$, independently of one another, are —H, halogen or —CH$_3$, $R_5$ and $R_6$, independently of one another, are —H or $C_1$–$C_4$alkyl, A is a para-phenylene radical of the formula II or a mixture of a para-phenylene radical of the formula II with an ortho-phenylene radical of the formula III

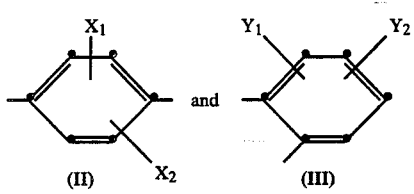

the proportion of ortho-phenylene radical in the mixture being not more than 60% by weight, and $X_1$ and $X_2$, independently of one another, are —H, halogen, —CH$_3$, —OCH$_3$ or —OC$_2$H$_5$, and $Y_1$ and $Y_2$, independently of one another, are —H, halogen, —CH$_3$ or —OCH$_3$, or $Y_1$ is a radical of the formula

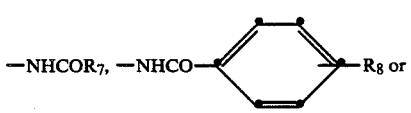

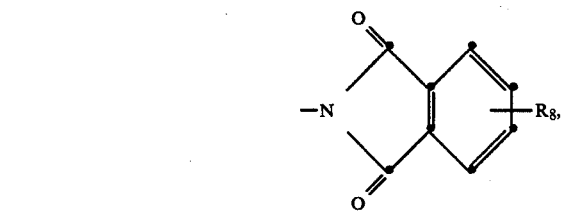

and $Y_2$ is —H, or $Y_1$ and $Y_2$ together are —NHCONH— or —CONHCO—, where $R_7$ is —H or $C_1$–$C_4$alkyl and $R_8$ is —H, halogen, —CH$_3$ or —OCH$_3$.

2. A thermoplastic material according to claim 1, in which, in the formula I, $R_5$ and $R_6$ are —H.

3. A thermoplastic material according to claim 1, in which, in the formula I, A is a para-phenylene radical of the formula IV

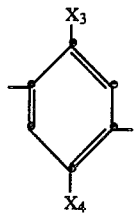

(IV)

where $X_3$ and $X_4$, independently of one another, are —H, —Cl, —CH$_3$ or —OCH$_3$.

4. A thermoplastic material according to claim 1, in which, in the formula I, A is a para-phenylene radical of the formula IV or a mixture of a para-phenylene radical of the formula IV and an ortho-phenylene radical of the formula III

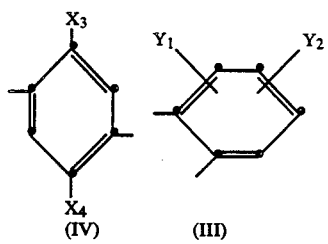

(IV)   (III)

where $X_3$, $X_4$, $Y_1$ and $Y_2$, independently of one another, are —H or —Cl.

5. A thermoplastic material according to claim 1, in which, in the formula I, A is para-phenylene or a mixture of para-phenylene and ortho-phenylene, and the ortho-phenylene proportion in the mixture is between 1 and 50% by weight and the groups $R_1$, $R_2$, $R_3$, $R_4$, $R_5$ and $R_6$ are —H.

6. A thermoplastic material according to claim 1, in which, in the formula I, $R_1$, $R_2$, $R_3$, $R_4$, $R_5$ and $R_6$ are —H and A is para-phenylene.

7. A thermoplastic material according to claim 1, wherein the high-molecular-weight material which can be processed in the melt is a polyolefin, a styrene polymer, a polycarbonate, polyvinyl chloride, a polyester, a polyamide, a fluorinated polymer, polymethyl methacrylate, a polyurethane, a polyacetal, a polyether, a polyphenylene oxide, a polysulfone, a polyphenylene sulfide, a polyimide, a polyesteramide or a copolymer of these substances.

8. A thermoplastic material according to claim 7, wherein polyethylene, polypropylene, polystyrene, a polyester, a polyamide, a polycarbonate or ABS is used.

* * * * *